Patented Apr. 11, 1944

2,346,155

UNITED STATES PATENT OFFICE 2,346,155

COMPOUNDED OIL

George H. Denison, Jr., and Paul C. Condit, Berkeley, Calif., assignors to Standard Oil Company of California, San Francisco, Calif., a corporation of Delaware No Drawing. Application February 23, 1942, Serial No. 432,040

14 Claims. (Cl. 252—32)

This invention relates to new and useful compositions of matter comprising a hydrocarbon oil containing a new combination of stabilizing agents. This combination comprises a thioether or seleno ether and an oxide, sulfide or selenide having directly connected to an oxygen, sulfur or selenium atom thereof both a metal in a basic form and an acid-forming element such as those occurring in groups III—A, IV, V—B and VI—B of Mendelyeev's Periodic Table of the Elements. More particularly, the invention involves compounded lubricants containing an anti-oxidant of the type represented by dialkyl thioethers or dialkyl seleno ethers and a stabilizer or activator of the type illustrated by the metal salts of organo-inorganic acids, such as acids of the weak acid-forming elements, boron, silicon and arsenic, or organo substituted carbonic and carbamic acids, or organo-inorganic acids of strong acid-forming elements, sulfur and phosphorus.

The present invention involves the discovery that dispersion in hydrocarbon oils of oxides, sulfides or selenides containing as a preferred group—

$$(A)(X)(Z)(X_1)(R_n)$$

in which A represents a basic salt-forming element or radical, X and $X_1$ are selected from the group consisting of oxygen, sulfur or selenium, Z is an acid-forming element selected from groups III—A, IV, V—B and VI—B of Mendelyeev's Periodic Table, R is an organic radical attached to Z either directly or indirectly through an intervening atom, and $n$ is a whole number no less than 1; together with thioethers, seleno ethers or telluro ethers, imparts new, unpredictable and desirable properties to the composition.

These new properties render the compounded oil particularly useful for various purposes. Increased resistance to deterioration under oxidizing conditions comprises one of the principal advantages of the compounded oils of this invention. This increased resistance is brought about in certain instances by a cooperative action between the two types of ingredients. The thioether, seleno ether or telluro ether type of component inhibits that kind of deterioration which results in increased corrosivity of the oil toward certain bearing metals, such as cadmium-silver or copper-lead bearing alloys. These components also inhibit oxidation of the base oil. This antioxidant action is frequently enhanced by the metal salts of organo-inorganic acids, this latter component serving to activate the ether compounds.

It is to be understood that the invention is not limited to the foregoing functional features. Different compounds of the general type herein involved vary in their degree of effectiveness and may impart one or more desirable properties to the composition. For example, the amount of wear produced in lubrication of metal surfaces may be reduced as compared with wear resulting with a straight uncompounded lubricating oil. In general, however, it has been discovered that the new compositions herein disclosed are more stable to deterioration by heat and oxidation than is a hydrocarbon oil with which the compositions are compounded. The new compounding agents of this invention are therefore useful where a stabilized oil is desired and resistance to deterioration is important. An example of such utility is their use as lubricating oils, particularly in internal combustion engines, to inhibit gumming of pistons, sticking of piston rings, sludge formation in the crankcase, and the like. The compositions are also useful as heat transfer fluids where it may be desirable to inhibit or prevent the formation of a deposit on the metal surfaces from or to which heat is being conveyed. Likewise, the increased resistance to oxidation imparted to the oils by the compounds of this invention finds various applications in insulating, switch or transformer oils.

The salt-like compounds of the type here involved may be regarded as salts of organic substituted acids of boron, silicon, arsenic, sulfur, phosphorus, etc. Metals preferred as the basic component of the salts utilized in this invention are calcium, strontium, barium, mangnesium, zinc, cadmium, aluminum, zirconium, chromium and molybdenum. Salts of bismuth, tin, lead, iron, cobalt, nickel, manganese, vanadium, sodium, potassium, copper and silver comprise additional examples of metals falling within the broader aspects of the invention. Basic salt-forming radicals such as the ammonium and amine radicals are not precluded.

These compounds may be most conveniently classified as salts of parent acids of the type formulae given hereinafter, even though the compounds are not in fact, in many instances, formed directly by neutralization of the parent acid. Accordingly, the compounding agents are referred to as salts of the acids with no intention that they must be formed or attainable from the acids.

The invention embraces as one component of the combination metal salts derived from acids selected from the following groups:

TYPE 1.—ACIDS OF BORON CONTAINING AN ORGANIC SUBSTITUENT

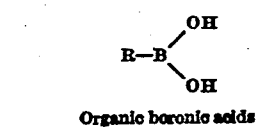
Organic boronic acids

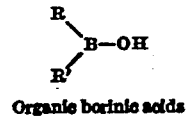
Organic borinic acids

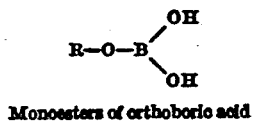
Monoesters of orthoboric acid

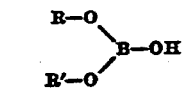
Diesters of orthoboric acid

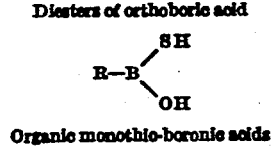
Organic monothio-boronic acids

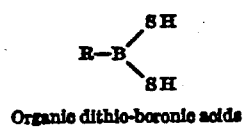
Organic dithio-boronic acids

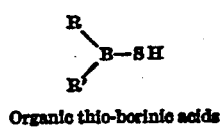
Organic thio-borinic acids

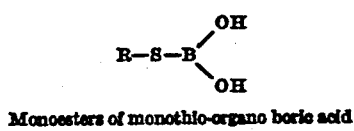
Monoesters of monothio-organo boric acid

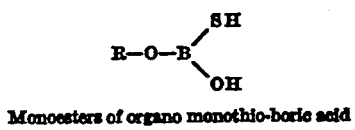
Monoesters of organo monothio-boric acid

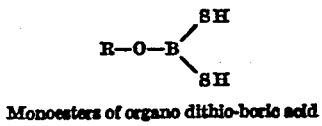
Monoesters of organo dithio-boric acid

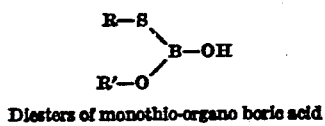
Diesters of monothio-organo boric acid

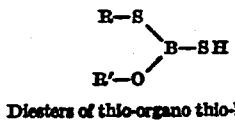
Diesters of thio-organo thio-boric acid

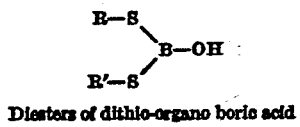
Diesters of dithio-organo boric acid

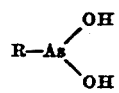
Diesters of dithio-organo thio-boric acid

TYPE 2.—ACIDS OF ARSENIC CONTAINING AN ORGANIC SUBSTITUENT

A.—*Trivalent arsenic*

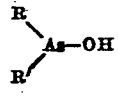
Organo ortho-arsonous acid (arsine dihydroxides)

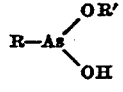
Organo arsinous acid (diorgano substituted arsine hydroxide)

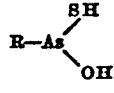
Monoester of organo ortho-arsonous acid

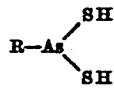
Organo monothio-arsonous acid

Organo dithio-arsonous acid

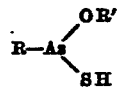
Monothio-ester of organo arsonous acid

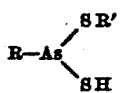
Monoester of organo monothio-arsonous acid

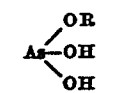
Monoester of organo dithio-arsonous acid

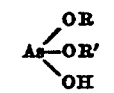
Monoester of arsenous acid

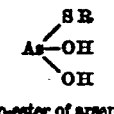
Diester of arsenous acid

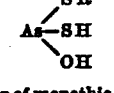
Monothio-ester of arsenous acid

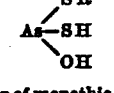
Monothio-ester of monothio-arsenous acid

Monoester of trithio-arsenous acid (monothio-ester of dithio-arsenous acid)

Monothio-diester of arsenous acid

Dithio-diester of arsenous acid

Monothio-diester of monothio-arsenous acid

B.—*Pentavalent arsenic*

Organo arsonic acid

Disubstituted organo arsinic acid

Monoester of organo arsonic acid

Organo thion-arsonic acid

Organo thion-monothiol-arsonic acid

Organo trithio-arsonic acid

Monoester of organo thion-arsonic acid

Monothio-ester of organo thion-arsonic acid

Monoester of organo trithio-arsonic acid

Monoester of thion-monothiol-arsonic acid

Organo monothiol-arsonic acid

Organo dithiol-arsonic acid

Monothio-ester of organo arsonic acid

Monothio-ester of organo thiol-arsonic acid

Monoester of organo thiol-arsonic acid

Diorgano substituted thion-arsinic acid

Diorgano substituted dithio-arsinic acid

Diorgano substituted thiol-arsinic acid

Monoester of arsenic acid

Diester of arsenic acid

Monothio-ester of arsenic acid

Monothio-ester of monothiol-arsenic acid

Monothio-ester of dithiol-arsenic acid

Monothio-diester of arsenic acid

Dithio-diester of arsenic acid

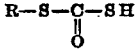
Monothio-diester of monothiol-arsenic acid

Monoester of monothion-arsenic acid

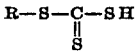
Diester of monothion-arsenic acid

Monothio-ester of monothion-arsenic acid

Monothio-ester of thion-monothiol-arsenic acid

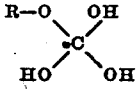
Monothio-ester of tetrathio-arsenic acid

Monothio-diester of thion-arsenic acid

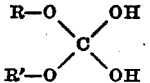
Dithio-diester of thion-arsenic acid

Monothio-diester of thion-monothiol-arsenic acid

TYPE 3.—CARBONIC ACIDS CONTAINING AN ORGANIC SUBSTITUENT

A.—Metacarbonic acid

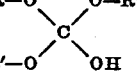
Partial ester of carbonic acid

Partial ester of thion-carbonic acid

Monothio-ester of thion-carbonic acid

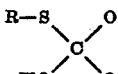
Monoester thiol-thion of carbonic acid

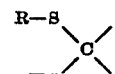
Monothio-ester thiol of carbonic acid

Partial ester of trithio-carbonic acid

B.—Orthocarbonic acid

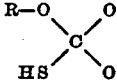
Monoester of orthocarbonic acid

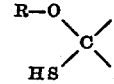
Diester of orthocarbonic acid

Triester of orthocarbonic acid and corresponding sulfur derivatives such as—

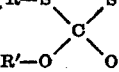 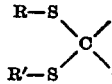

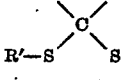 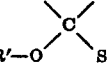

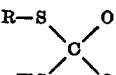 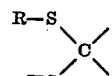

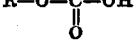 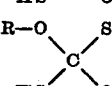

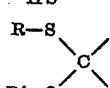 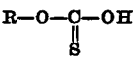

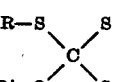 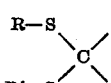

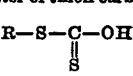 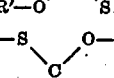

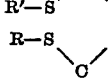 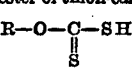

 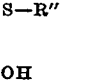

TYPE 4.—ACIDS OF SILICON CONTAINING AN ORGANIC SUBSTITUENT

A.—*Mono-organo acids of silicon*

B.—*Diorgano acids of silicon*

C.—*Triorgano acids of silicon*

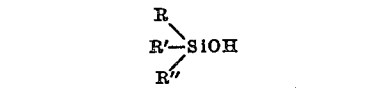

D.—*Partial esters of:*

Mono-orthosilicic acid, $H_4SiO_4$
Diorthosilicic acid, $H_6Si_2O_7$
Triorthosilicic acid, $H_8Si_3O_{10}$
Tetraorthosilicic acid, $H_{10}Si_4O_{13}$
Pentaorthosilicic acid, $H_{12}Si_5O_{16}$
Monometasilicic acid, $H_2SiO_3$
Dimetasilicic acid, $(H_4Si_2O_6)$
Trimetasilicic acid, $(H_6Si_3O_9)$
Tetrametasilicic acid, $(H_8Si_4O_{12})$
Pentametasilicic acid, $(H_{10}Si_5O_{15})$
Dimesosilicic acid, $H_2Si_2O_5$
Trimesosilicic acid, $H_4Si_3O_8$
Tetramesosilicic acid, $H_6Si_4O_{11}$
Pentamesosilicic acid, $H_8Si_5O_{14}$
Triparasilicic acid, $H_2Si_3O_7$
Tetraparasilicic acid, $H_4Si_4O_{10}$
Pentaparasilicic acid, $H_6Si_5O_{13}$
Tetratetrerosilicic acid, $H_2Si_4O_9$
Pentatetrerosilicic acid, $H_4Si_5O_{12}$
Penterosilicic acid, $H_2Si_5O_{11}$

TYPE 5.—ACIDS OF PHOSPHORUS CONTAINING AN ORGANIC SUBSTITUENT

A.—*Acids of trivalent phosphorus*

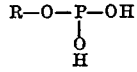

Monoester of phosphorous acid

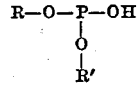

Diester of phosphorous acid

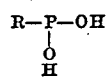

Phosphonous acid

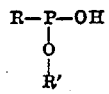

Monoester of phosphonous acid

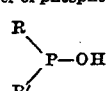

Phosphinous acid

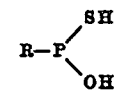

Monothio-phosphonous acid

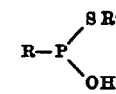

Monothio-ester of phosphonous acid

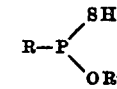

Monoester of thiol-phosphonous acid

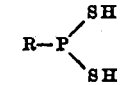

Dithio-phosphonous acid

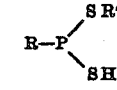

Diester of dithio-phosphonous acid

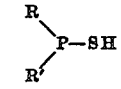

Thio-phosphonous acid

B.—*Acids of pentavalent phosphorus (preferred)*

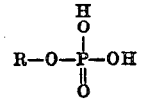

Monoester of phosphoric acid

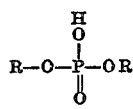

Diester of phosphoric acid

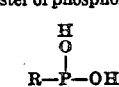

Phosphonic acid

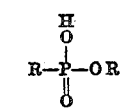

Monoester of phosphonic acid

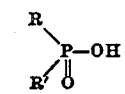

Phosphinic acid

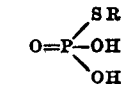

Monothio-ester of phosphoric acid

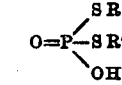

Dithio-ester of phosphoric acid

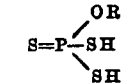

Monoester of tetrathio-phosphoric acid

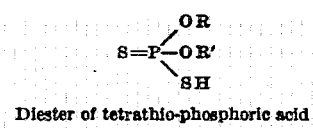
Diester of tetrathio-phosphoric acid

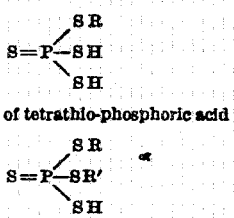
Monothio-ester of tetrathio-phosphoric acid

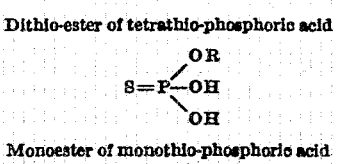
Dithio-ester of tetrathio-phosphoric acid

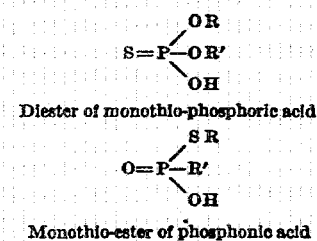
Monoester of monothio-phosphoric acid

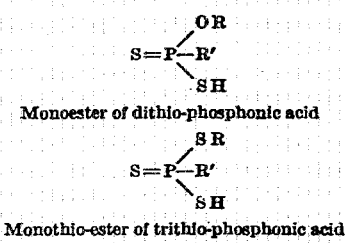
Diester of monothio-phosphoric acid

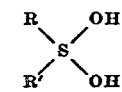
Monothio-ester of phosphonic acid

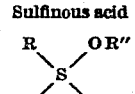
Monoester of dithio-phosphonic acid

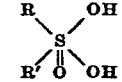
Monothio-ester of trithio-phosphonic acid

TYPE 6.—ACIDS OF SULFUR CONTAINING AN ORGANIC SUBSTITUENT

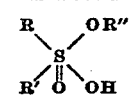
Sulfinous acid

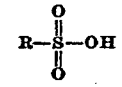
Monoester of sulfinous acid

Sulfinic acid

Monoester of sulfinic acid

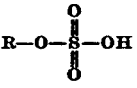
Sulfonic acid

Monoester of sulfuric acid

In all of the foregoing type formulae R, R' and R" are radicals of hydrocarbon structure. It is understood that by the term "hydrocarbon structure" it is intended to include hydrocarbon groups containing polar radicals such as OH, SH, Cl, NH₂ and COOH. Likewise, this term includes radicals containing ether, sulfide and ester groups. Thus, throughout the specification and claims the term "radical of hydrocarbon structure" includes:

(a) Alkyl radicals, such as amyl, isoamyl, hexyl, heptyl, octyl, the isomeric octyls, lauryl, dodecyl (normal or branched chain), tetradecyl and cetyl (normal or branched chain) radicals;

(b) Aryl, such as the phenyl, diphenyl and naphthyl, radicals;

(c) Aralkyl, such as phenyloctadecyl and similar alkyl radicals connected to the central acid-forming atom, e. g. boron or arsenic, and having an aryl group as a substituent in the alkyl chain;

(d) Alkaryl, such as methylphenyl, cetylphenyl, and other radicals where the aryl group is directly attached to the central acid-forming atom, e. g. boron or arsenic, and is substituted with an alkyl group;

(e) Cyclic nonbenzenoid radicals, such as cyclohexyl or other alicyclic radicals;

(f) Oxy radicals such as those in which the hydrogen of an hydroxyl group has been replaced by esterification, etherification, neutralization with a metal, or the like;

(g) Radicals containing thio, amino, halogen or other groups.

It should be borne in mind that in the foregoing type formulae all of the acids listed may not exist as such and that it is the salt-like derivatives thereof with which the present invention is concerned. Accordingly, existence of the free acid in a stable form is not a prerequisite to the preparation of the derivatives thereof contemplated herein. It should also be observed that various of the salt-like derivatives are relatively insoluble in organic solvents such as hydrocarbon oils. However, oil-solubility is not an absolute prerequisite for utility of the present invention in its broadest aspects, as will be explained in more detail hereinafter; nevertheless, oil-soluble compounds are preferred.

In general, salts and preferably polyvalent metal salts falling within the broader aspects of the invention are of: organic substituted derivatives of acids of boron, organic substituted derivatives of acids of arsenic, organic substituted carbonic acids, organic substituted carbamic acids, organic substituted acids of silicon, organic substituted acids of germanium, such as tri-substituted germanols, germanonic acids, and germanic acid anhydrides, organic substituted acids of tin such as organo stannonic acids and organo thiostannic acids, organic substituted acids of antimony such as organo stibinous acids, organo stibonic acids and organo stibinic acids, analogous weak acids of bismuth, chromium, molybdenum and manganese in those instances where organo salt-forming acids are obtainable, and organo substituted acids of phosphorus and of sulfur.

To illustrate the properties and general methods of preparation applicable to the foregoing general groups of compounds the following discussion is given:

TYPE 1.—ACIDS OF BORON CONTAINING AN ORGANIC SUBSTITUENT AND METAL SALTS THEREOF

The preferred acids of boron are substituted acids of trivalent boron, and the preferred salts comprise the magnesium, aluminum, calcium, barium, tin and chromium salts of these acids. Examples of such salts are: the magnesium, aluminum, calcium, barium, tin and chromium salts of monododecyl, monotetradecyl, monocetyl, mono-octadecyl, mono-(amylphenyl), mono-(decylphenyl), mono-(dodecylphenyl), mono-(tetradecylphenyl), mono-(cetylphenyl), and mononaphthenyl, boric acids; the magnesium, aluminum, calcium, barium, tin and chromium salts of dihexyl, dioctyl, didecyl, didodecyl, ditetradecyl, dicetyl, dioctadecyl, diphenyl, dibenzyl, di-(ethylphenyl), di-(amylphenyl), di-(decylphenyl), di-(dodecylphenyl), di-(cetylphenyl), and dicyclohexyl, boric acids; the magnesium, aluminum, calcium, barium, tin and chromium salts of dodecyl, tetradecyl, cetyl, octadecyl, amylphenyl, decylphenyl, dodecylphenyl, tetradecylphenyl, cetylphenyl, and naphthenyl, boronic acids; the magnesium, aluminum, calcium, barium, tin and chromium salts of dihexyl, dioctyl, didecyl, didodecyl, ditetradecyl, dicetyl, dioctadecyl, diphenyl, dibenzyl, di-(ethylphenyl), di-(amylphenyl), di-(decylphenyl), di-(d o d e c y l-phenyl), and di-(cetylphenyl), borinic acids.

The substituted acids of boron utilized in the preparation of the salts of this invention may be obtained by known methods. For example, the monoesters of boric acid and diesters of boric acid are obtainable by hydrolysis of the triester, and the desired salts may be prepared from either the unneutralized partially hydrolyzed ester or from the sodium salt thereof by reaction with the desired metal ion.

The diesters of boronic acids are obtainable, for example, by the slow oxidation of trialkyl borine. Also, the aliphatic and aromatic boronic acids can be prepared readily by the reaction of Grignard reagents upon alkyl esters of boric acid or the etherate of boron trifluoride instead of an alkyl borate.

In general, it may be explained that boric esters may be prepared by the action of alcohols on boric anhydride under pressure. These esters react with Grignard's reagents to form the boronic acids according to the equation:

When magnesium phenyl bromide is utilized, a methylating action occurs so that, in addition to phenyl boronic acid, toluene is obtained. The lower boronic acid esters are readily hydrolyzed by cold water to yield the free boronic acid.

The following will illustrate in more detail a method of preparing a typical substituted acid of boron. Alkyl boronic acids in general may be prepared by this procedure without essential modification:

A 1-liter 3-necked flask is fitted with an efficient mercury sealed stirrer and one neck provided with a low temperature thermometer and a glass tube for the introduction of nitrogen. The remaining neck carries a 500 cc. separatory funnel and an outlet tube for nitrogen or other inert gas. The nitrogen outlet tube and the top of the separatory funnel are connected to two arms of a Y-tube, the third arm of which is sealed by a mercury valve. Dry nitrogen, purified over sulfuric acid and alkaline pyrogallol, is allowed to flow through the apparatus for about twenty minutes. Then 55 grams (0.53 mol) of pure methyl borate is added quickly through the separatory funnel and washed through with 150 cc. of anhydrous ether. The flask is suspended in a Dewar dish containing a mixture of acetone and solid carbon dioxide and the solution stirred during cooling. When the internal temperature has fallen to about —75°, 300 cc. (0.5 mol) of alkyl magnesium bromide solution (1.66 N) is introduced slowly through the separatory funnel over a period of several hours. The flow of nitrogen and vigorous stirring are maintained during the addition and the temperature held below —70°. During the addition a voluminous precipitate separates. When the addition is complete, the mixture is stirred at —70° for several hours and allowed to stand in the cooling bath over night to insure completion of the reaction. The flask is then opened momentarily and the cake of precipitate broken into small amounts. The apparatus is reassembled and 300 cc. of water containing 30 cc. of sulfuric acid added with stirring and cooling. The ethereal layer is separated and the aqueous layer extracted with 50 cc. of ether. The extract is combined with the main ether layer. The ethereal solution is concentrated on a steam bath and distillation continued until all material volatile at the temperature of the bath is removed. The acid which separates upon cooling the residual liquid is filtered with suction and may be dried in a nitrogen-filled desiccator over 65% sulfuric acid. This crude acid may be purified by warming with 275 cc. of toluene, the solution filtered at 60° C. and chilled thoroughly to cause crystallization.

The necessity for maintaining extremely low temperatures, as in the above method, may be avoided by using a less volatile ester as a starting material, for example, by using n-butyl borate.

*Example 1.*—n-Tetradecanol is converted to the bromide (B. P. 132–135° F. at 2 mm.). The Grignard reagent from this bromide is added to n-butyl borate and gives a crude impure acid contaminated with the hydrocarbon $C_{28}H_{58}$. The latter may be removed by dissolving the crude acid in 95% alcohol and chilling. The purified n-tetradecane boronic acid is obtained by evaporation of the alcohol and crystallization from petroleum ether.

*Example 2.*—Cetyl alcohol is converted to the bromide. The Grignard reagent from this bromide is added to a suitable borate ester such as the n-butyl borate.

*Example 3.*—Phenyl magnesium bromide is added to n-butyl borate to obtain the benzene boronic acid as in the foregoing examples.

*Example 4.*—Cetylphenyl magnesium bromide obtained from cetyl benzene may be used to prepare cetylphenyl or cetyl benzene boronic acid.

As previously indicated, salts of the foregoing acids may be prepared by treating the acid with aqueous alcoholic sodium hydroxide and then precipitating the various salts by adding an aqueous solution containing the desired metal ion. For example, cetyl boronic acid is reacted with aqueous alcoholic sodium hydroxide to give sodium cetyl boronate from which various salts are prepared as follows:

*Example 5.*—Aqueous calcium chloride is added to the aqueous alcoholic solution of sodium cetyl boronate to precipitate calcium cetyl boronate. The precipitate is filtered, washed and dried, or it may be taken up immediately upon precipitation by dissolving in an organic solvent such as a hydrocarbon mineral oil.

*Example 6.*—To prepare the zinc salt, aqueous zinc chloride solution is added to the alcoholic sodium cetyl boronate solution.

*Example 7.*—To prepare the magnesium salt, aqueous magnesium chloride or magnesium sulfate solution is added to the alcoholic sodium cetyl boronate solution.

*Example 8.*—To prepare the aluminum salt, aqueous aluminum chloride or aluminum sulfate solution is added to the alcoholic sodium cetyl boronate solution.

*Example 9.*—To prepare the tin salt, aqueous tin chloride solution is added to the alcoholic sodium cetyl boronate solution.

*Example 10.*—To prepare the lead salt, aqueous lead acetate solution is added to the alcoholic sodium cetyl boronate solution.

*Example 11.*—To prepare the chromium salt, aqueous chromic sulfate or chrome alum solution is added to the alcoholic sodium cetyl boronate solution.

*Example 12.*—To prepare the manganese salt, aqueous manganese sulfate solution is added to the alcoholic sodium cetyl boronate solution.

*Example 13.*—To prepare the nickel salt, aqueous nickel chloride solution is added to the alcoholic sodium cetyl boronate solution.

*Example 14.*—To prepare the cobalt salt, aqueous cobalt chloride solution is added to the alcoholic sodium cetyl boronate solution.

A borinic acid is obtained when boron diphenyl chloride or bromide is treated with sodium hydroxide and the clear solution neutralized with hydrochloric acid. The dibenzene borinic acid results and readily forms alkali metal salts which in turn may be converted to a polyvalent metal salt by reaction with the desired metal ion.

Salts of the partially esterified boric acids may be prepared by partially hydrolyzing the ester with sodium hydroxide to obtain the sodium salt of the partial ester. Other salts may be precipitated by double decomposition in accordance with the methods described in the foregoing examples.

TYPE 2.—ACIDS OF ARSENIC CONTAINING AN ORGANIC SUBSTITUENT AND METAL SALTS THEREOF

Aryl arsine oxides may be regarded as the anhydride of arsonous acids. Arsonous acids are also called dihydroxy arsines. The unsubstituted oxides are readily obtained by treating the corresponding dihalogenated arsines with alkali hydroxides or carbonates in the reaction—

$$R-AsCl_2+Na_2CO_3 \rightarrow R-AsO+2NaCl+CO_2$$

They form white crystalline substances readily soluble in organic solvents, sparingly in alcohol, and insoluble in water. The arsine oxides are amphoteric, dissolving in concentrated aqueous caustic alkalies, and will form the disodium salt when such solutions are properly treated.

Although unsubstituted aryl dihydroxy arsines or arsonous acids corresponding to the formula—

$$R-As(OH)_2$$

have not been isolated, the esters may be successfully obtained; for example, by the interaction of phenyl dichloro arsine and sodium alcoholates or phenylates—

$$C_6H_5AsCl_2+2RONa \rightarrow C_6H_5As(OR)_2+2NaCl$$

In the case of the catechyl ester the lead salt of catechol is employed. These esters may be converted to the metal salt of the half ester or both hydrocarbon radicals of the ester group substituted with metal to obtain the compounding agents of this invention. More detailed descriptions of methods of preparing various salts will be given hereinafter.

Several methods are available for the preparation of aliphatic arsonic acids:

(1) Hydrolysis of the corresponding alkyl arsine oxyhalides or tetrahalides—

$$R-AsOCl_2+2H_2O \rightarrow R-AsO(OH)_2+2HCl$$

$$R-AsCl_4+3H_2O \rightarrow R-AsO(OH)_2+4HCl$$

(2) Oxidation of primary aliphatic dihalogenated arsines by means of moist silver oxide or hydrogen peroxide—

$$R-AsCl_2+Ag_2O+2H_2O \rightarrow$$
$$R-AsO(OH)_2+2HCl+2Ag$$

$$2R-AsCl_2+4H_2O_2 \rightarrow 2R-AsO(OH)_2+4HCl+O_2$$

(3) Oxidation of alkyl arsines by atmospheric oxygen—

$$2R-AsH_2+3O_2 \rightarrow 2R-AsO(OH)_2$$

(4) The reaction of alkyl halides with alkali arsenites is highly useful for present purposes because it yields directly an alkali salt of the arsonic acids according to the reaction—

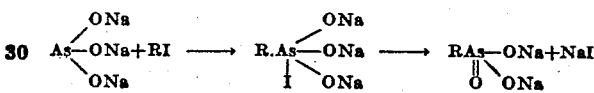

These sodium salts may be converted to other metal salts by double decomposition, e. g., the calcium salts are precipitated by adding aqueous calcium chloride to aqueous solutions of the sodium salts. Dialkyl arsinic acids may be prepared from secondary trivalent aliphatic arsenicals by oxidation with oxygen or mercuric oxide; from alkyl dichloro arsines and bromine in the presence of water, or by the action of mercuric oxide upon alkyl arsine oxides. The lower members of this series of acids are highly stable and readily form metallic salts.

Thio-dialkyl arsinic acid salts are obtained by the action of hydrogen sulfide upon the respective metal dialkyl arsinates or from the dialkyl arsinic disulfides and metallic salts in alcoholic medium. The effectiveness of some of these thio-dialkyl arsinates may not be due primarily to the compounds themselves but rather to decomposition products thereof after addition to oil, as contemplated by the present invention.

An additional example of the preparation of thio compounds utilizes the aryl arsine sulfides and sesquisulfides as starting materials. The arsine sulfides may be obtained by the action of hydrogen sulfide upon the corresponding arsonic acids:

$$R-AsO(OH)_2-2H_2S \rightarrow R-AsS+S+3H_2O$$

These compounds form sulfo-salts with either alkali olysulfides or alkali sulfides and sulfur:

$$R-AsS+M_2S+S \rightarrow R-AsS(SM)_2$$

where M is an alkali metal. The aryl arsine sesquisulfides also dissolve in alkali polysulfides, forming sulfo-salts:

$$R_2-As_2S_3+M_2S_2+M_2S \rightarrow 2R-AsS(SM)_2$$

There are also a number of methods by which aryl or alkaryl arsonic acids may be prepared.

The following are exemplary:

(1) Diazotizing aryl or alkaryl amines and treating the resulting diazo or isodiazo compounds with sodium arsenite in either alkaline or neutral solution, the reaction proceeding according to the equation:

$$RN=NX + Na_3AsO_3 \rightarrow RAsO(ONa)_2 + NaX + N_2$$

The reaction with normal diazo compounds is facilitated by the use of catalysts, such as metallic copper, cuprous hydroxide or copper salts in the absence of free alkali;

(2) By oxidizing aryl arsines with nitric acid—

$$RAsH_2 + 3O \rightarrow RAsO(OH)_2$$

(3) By oxidizing arsine oxides, e. g., with hydrogen peroxide in alkaline solution—

$$RAsO + O + H_2O \rightarrow RAsO(OH)_2$$

The metal salts are readily formed from these acids.

Esters may be prepared from sodium alkoxides and aryl arsine oxychlorides:

$$C_6H_5AsOCl_2 + 2RONa \rightarrow C_6H_5AsO(OR)_2 + 2NaCl$$

or by double decomposition between alkyl iodides and silver arsonates, e. g.:

$$C_6H_5AsO(OAg)_2 + 2RI \rightarrow C_6H_5AsO(OR)_2 + 2AgI$$

These esters in turn may be partially hydrolyzed and the sodium or other metal salts of the half ester obtained.

Hydroxy aryl arsonic acids may be obtained by directly heating phenol arsenates (Béchamp reaction) or from amino arsonic acids by diazotizing and replacing the diazo group with a hydroxyl in the usual manner.

It should be observed that the straight phenyl substituted acids of arsenic and their salts are, in general, relatively insoluble in organic solvents such as hydrocarbon oils. Accordingly, it is preferred to utilize an aryl radical containing an alkyl substituent since it is found that such substituted aryl radicals impart greater oil solubility to the final compounds. However, it is to be understood that oil solubility is not an absolute prerequisite for utility of the present invention in its broader aspects, as will be explained in more detail hereinafter.

Salts of heterocyclic substituted acids of arsenic are also contemplated within the scope of the invention: thienyl-2-arsonic acid or oil-soluble derivatives thereof, and methyl benzodiazole arsonic acids are exemplary.

The preferred acids are substituted acids of pentavalent arsenic and the preferred salts comprise the oil-soluble magnesium, aluminum, calcium, barium, tin and chromium salts of these acids. Examples of salts of organo substituted acids of arsenic are:

*Partially esterified arsonous acids* (type formula of salt-forming acid,

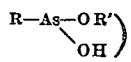
)

The magnesium, aluminum, calcium, barium, tin and chromium salts of hexyl, octyl, decyl, tetradecyl, cetyl and benzyl, phenylarsonous acids; the magnesium, aluminum, calcium, barium, tin and chromium salts of cetyl and cetylphenyl, cetylphenylarsonous acids.

*Salts of dialkyl arsinic acids,*

The magnesium, aluminum, calcium, barium, tin and chromium salts of di-isoamyl, dihexyl, dioctyl, dideoyl, didodecyl, ditetradecyl, and dicetyl, arsinic acids.

*Salts of alkaryl arsonic acids,*

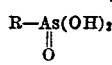

The magnesium, aluminum, calcium, barium, tin and chromium salts of amylphenyl, decylphenyl, dodecylphenyl, tetradecylphenyl and cetylphenyl, arsonic acids.

*Salts of aryl arsonic acids,*

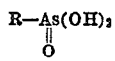

The magnesium, aluminum, calcium, barium, tin and chromium salts of naphthyl and hydroxyphenyl, arsonic acid.

*Salts of partially esterified aryl arsonic acids* (type formula of salt-forming acid,

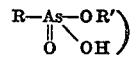
)

The magnesium, aluminum, calcium, barium, tin and chromium salts of monohexyl, monooctyl, monodecyl, monotetradecyl, monocetyl and monobenzyl, esters of phenylarsonic acid.

*Salts of alkyl arsonic acids,*

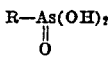

The magnesium, aluminum, calcium, barium, tin and chromium salts of dodecyl, tetradecyl, cetyl, octadecyl, n-propyl and allyl, arsonic acids.

*Salts of partially esterified alkyl arsonic acids* (type formula of salt-forming acid,

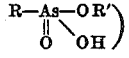
)

The magnesium, aluminum, calcium, barium, tin and chromium salts of monodecyl, monododecyl, monotetradecyl and monocetyl, esters of propylarsonic acid.

In general, the alkali metal salts are the easiest prepared, and the other desired metal salts utilized in this invention may be obtained from aqueous or aqueous alcoholic solutions of the alkali metal salts by adding an aqueous solution containing the desired metal ion. For example, solutions of the sodium salts of arsonic acids may be prepared by neutralization of the free acid.

*Example 15.*—Aqueous calcium chloride is added to an aqueous solution of sodium allyl arsonate to precipitate the calcium allyl arsonate. The precipitate is filtered, washed and dried or it may be taken up immediately upon precipitation by dissolving in an organic solvent such as a hydrocarbon mineral oil.

*Example 16.*—To prepare the zinc salt, aqueous zinc chloride solution is added to the sodium allyl arsonate solution.

*Example 17.*—To prepare the magnesium salt, aqueous magnesium chloride or magnesium sulfate solution is added to the sodium allyl arsonate solution.

*Example 18.*—To prepare the aluminum salt, aqueous aluminum chloride or aluminum sulfate solution is added to the sodium allyl arsonate solution.

*Example 19.*—To prepare the tin salt, aqueous tin chloride solution is added to the sodium allyl arsonate solution.

*Example 20.*—To prepare the lead salt, aqueous lead acetate solution is added to the sodium allyl arsonate solution.

*Example 21.*—To prepare the chromium salt, aqueous chromic sulfate or chrome alum solution is added to the sodium allyl arsonate solution.

*Example 22.*—To prepare the manganese salt, aqueous manganese sulfate solution is added to the sodium allyl arsonate solution.

*Example 23.*—To prepare the nickel salt, aqueous nickel chloride solution is added to the sodium allyl arsonate solution.

*Example 24.*—To prepare the cobalt salt, aqueous cobalt chloride solution is added to the sodium allyl arsonate solution.

Salts of other alkyl arsonic acids are prepared in a similar manner. Where the alkali metal salt of the parent acid is insufficiently water-soluble to give a suitable dispersion (complete water-solubility is unnecessary in many instances), auxiliary solvents may be mixed with the water to aid solution of the sodium salt. Alcohol is an example of an auxiliary solvent.

Salts of the partially esterified arsonic acids may be prepared by partially hydrolyzing the ester, e. g. with sodium hydroxide to obtain the sodium salt of the partial ester. Other salts may be prepared by double decomposition in accordance with the methods described in the foregoing examples.

TYPE 3.—CARBONIC ACIDS CONTAINING AN ORGANIC SUBSTITUENT AND METAL SALTS THEREOF

The preferred acids are organo substituted acids of thio-carbonic acids, and the preferred salts comprise the magnesium, aluminum, calcium, barium, tin and chromium salts of these acids. Examples of metal thio-carbonates are:

The magnesium, aluminum, calcium, barium, tin and chromium salts of monododecyl, monotetradecyl, monocetyl, mono-octadecyl, mono-(amylphenyl), mono-(decylphenyl), mono-(dodecylphenyl), mono-(tetradecylphenyl), mono-(cetylphenyl), and mononaphthenyl, esters of thiolthion carbonic acid; the magnesium, aluminum, calcium, barium, tin and chromium salts of monododecyl, monotetradecyl, monocetyl, mono-octadecyl, mono-(amylphenyl), mono-(decylphenyl), mono-(dodecylphenyl), mono-(tetradecylphenyl), mono-(cetylphenyl), and mononaphthenyl, esters of dithiol carbonic acid; the magnesium, aluminum, calcium, barium, tin and chromium salts of monododecyl, monotetradecyl, monocetyl, mono-octadecyl, mono-(amylphenyl), mono-(decylphenyl), mono-(dodecylphenyl), mono-(tetradecylphenyl), mono-(cetylphenyl), and mononaphthenyl, esters of trithio carbonic acid.

Corresponding derivatives of orthocarbonic acid in which sulfur may or may not be substituted for one or more of the oxygens of the carbonate radical, and of oxy-metacarbonic acid are contemplated within the broader aspects of the invention. It should be observed that the lower members of the oxy-carbonate series, such as salts of methyl or ethyl carbonic acid, tend to be decomposed by water which is a disadvantage. Also note that carbonates and carboxylates are distinctly different types of compounds.

The various substituted carbonic acids and salts thereof utilized in this invention may be obtained by known methods. The primary esters of carbonic acid are not stable in a free condition but may be prepared from the alcohols and carbon dioxide at low temperatures. The barium salt of methyl carbonic acid is obtained on conducting carbon dioxide into a methyl alcohol solution of anhydrous barium hydroxide. Magnesium methoxide combines with carbon dioxide to form magnesium methyl carbonate. The potassium salt of ethyl carbonic acid separates in pearly scales on adding carbon dioxide to the alcoholic solution of potassium alcoholate. The magnesium salt of ethyl carbonic acid results from the electrolysis of a well-cooled sodium ethylate solution when using magnesium electrodes and a high current density. The barium salt of ethyl carbonic acid is obtainable by conducting carbon dioxide into a very concentrated alcoholic solution of barium ethylate. Aluminum diethylate, monoethyl carbonate,

$Al(OC_2H_5)_2OCOOC_2H_5$ results from the action of carbon dioxide on aluminum triethylate in benzene solution. The sodium salt of phenyl carbonic acid may be prepared by the action of dry carbon dioxide on perfectly dry sodium phenate.

The salts of esters of organo thio-carbonic acids may be obtained—

(1) By the union of the anhydrides, $CO_2$, COS, $CS_2$, with—
   (a) The sulfides of the alkali and alkaline earth metals;
   (b) The mercaptides of the alkali metals; and
   (c) By the union of the last two with alcoholates;

(2) By the transposition of the salts thus obtained with alkyl halides and alkylene dihalides;

(3) By the action of alcohols and alcoholates, mercaptans and alkali mercaptides on $COCl_2$, $Cl.CO_2C_2H_5$, $CSCl_2$, and $Cl.CS_2C_2H_5$.

Where the pure ester results in these syntheses, partial hydrolysis and neutralization of the free acid group may be utilized to obtain the salt.

The alkali salts of thiolthion carbonic acid esters (sulfothio-carbonic acid esters) are conveniently obtained by the interaction of carbon disulfide and alkali hydroxides in alcoholic solution by reactions, such as—

$CS_2 + KOH + C_2H_5OH \rightarrow C_2H_5OCSSK$

Other metal salts may be obtained from the alkali thio-carbonates thus prepared by double decomposition reactions. For example, cupric inorganic salts precipitate yellow cuprous thiolthion carbonates together with disulfides.

Alkali alcoholates and alkyl thiolthion carbonates react to form salts of alkyl thiol carbonic acids by the reaction:

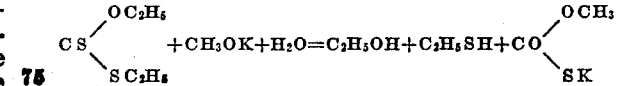

Alkali salts of trithio-carbonic acid are the products of interaction between carbon disulfide and alkali sulfide. The alkali salts of the trithio-carbonic acids may be reacted with ethyl chloride or the like to replace the alkali metal atom with the corresponding organic group to form the ester.

TYPE 4.—ACIDS OF SILICON CONTAINING AN ORGANIC SUBSTITUENT AND METAL SALTS THEREOF

In general, the orthosilicate and metasilicate esters are formed by the action of the corresponding alcohols on silicon fluoroform, SiHF$_3$.

Triphenyl silicol, (C$_6$H$_5$)$_3$SiOH, is formed from triphenylchloro silicate by boiling with water and a little ammonium hydroxide. It is also produced from the bromide by potassium hydroxide solution at 100° C. or by treating the silicone, (C$_6$H$_5$)$_2$SiO, with Grignard reagent. Triphenyl silicol trisulfonic acid, (C$_6$H$_4$SO$_3$H)$_3$SiOH, is made by gently warming one part of the above silicol with six parts of fuming sulfuric acid. When it is all dissolved, the solution is poured into cold water, neutralized with barium carbonate, then gently warmed and filtered from barium sulfate. Evaporation of the filtrate yields the barium salt in white flakes.

Triethylsilyl - 4 - trimethylplumbyl - benzene, (C$_2$H$_5$)$_3$SiC$_6$H$_4$Pb(CH$_3$)$_3$, is obtained from the magnesium compound of triethyl - p - bromophenyl monosilane and trimethyl lead chloride in ether. 1-triethylsilyl-4-triethylstannyl-benzene, (C$_2$H$_5$)$_3$SiC$_6$H$_4$Sn(C$_2$H$_5$)$_3$, is similarly prepared from the magnesium compound of triethyl-p-bromophenyl monosilane and triethyl tin bromide. 1-triethylsilyl-4-diphenylarsyl-benzene, (C$_2$H$_5$)$_3$SiC$_6$H$_4$As(C$_6$H$_5$)$_2$, is produced from the sodium compound of diphenylchloro arsine and triethyl-p-chlorophenyl monosilane in ether and a little acetic ester.

TYPE 5.—ACIDS OF PHOSPHORUS CONTAINING AN ORGANIC SUBSTITUENT AND METAL SALTS THEREOF

The salts of the substituted acids of phosphorus involved herein are preferably formed from substituted acids of pentavalent phosphorus. Substituted phosphoric acids containing at least twelve carbon atoms are preferred, but where the salts are sufficiently soluble in oil acids containing fewer carbon atoms may be utilized. Examples of preferred type acids are alkyl or alkaryl substituted phosphoric acids having at least twelve carbon atoms in the molecule. The preferred acids are monoesters of orthophosphoric acids or mixtures containing the monoester and the preferred salts are illustrated by the magnesium, aluminum, calcium, barium, tin and chromium salts of monododecyl, monotetradecyl, mono-octadecyl, monocetyl, mono-oleyl, mono-(amylphenyl), mono-(decylphenyl), mono-(dodecylphenyl), mono-(tetradecylphenyl), mono-(cetylphenyl), mono - (di - amylphenyl), and mono-naphthenyl, esters of phosphoric acids.

The substituted acids of phosphorus utilized herein may be prepared by methods known in the art. For example, a mixture of a higher alcohol and phosphorus pentoxide in ethyl ether may be refluxed for several hours. The reaction by which the substituted phosphoric acid is formed in this process is believed to be represented by the following equation—

ROH+C$_2$H$_5$OC$_2$H$_5$+P$_2$O$_5$→RC$_2$H$_5$HPO$_4$+C$_2$H$_5$PO$_3$ where R is an alkyl radical. The alkyl ethyl phosphoric acid is soluble in ether, while the ethyl metaphosphate is not, and the ether solution of the former may be separated from the latter by decantation. In preparing the metal salts herein involved, the ethyl group in the ethyl phosphoric acid above mentioned may be hydrolyzed to form the metal salt of the monoalkyl orthophosphoric acid, i. e. the salt of RH$_2$PO$_4$. This type of process is not limited to the alkyl derivatives but includes aryl ethyl phosphoric acid, alkaryl ethyl phosphoric acid, aralkyl ethyl phosphoric acid and ethyl phosphoric acids containing a cyclic non-benzenoid group.

Acids of trivalent phosphorus containing an organic substituent may be prepared by methods known in the art. For example, the symmetrical esters, P(OR)$_3$, are obtained from phosphorous trichloride and the sodium alcoholates and are converted by water or dilute acids into the dialkyl esters, P—OH(OR)$_2$, where R is alkyl. Likewise, the symmetrical esters may be changed to the salt of the mono- or di-ester by the action of an alkali hydroxide. The reaction of phosphorous trichloride on the alcohols yields the dialkyl esters. The symmetrical esters are isomerized by alkyl iodides into the alkyl phosphonic acid esters which in turn can be converted to salts by hydrolysis and neutralization.

The thioacids of phosphorus may be prepared by various methods. For example, a mixture of phosphorus pentasulfide and a higher alcohol, or of a mercaptan and phosphorus pentoxide, or of a mercaptan and phosphorus pentasulfide, or a three-component mixture, such as phosphorous pentoxide, pyrophosphoric acid and a mercaptan, may be directly fused and reacted in proportions to give acid esters of thioacids of phosphorus. The reaction in the three-component mixture is believed to be represented by the following equations:

2RSH+P$_2$O$_5$→H$_2$RSPO$_3$+RSPO$_2$

2RSH+RSPO$_2$+H$_4$P$_2$O$_7$→3H$_2$RSPO$_3$

The metal salts of the various substituted oxy-acids of phosphorus may be conveniently prepared by reacting the acid with sodium hydroxide or potassium hydroxide and then precipitating the desired metal salt from a solution of the sodium or potassium salt by the addition of the appropriate metal ion. The salt also may be prepared by the direct neutralization of the acid as, for example, with lime where the calcium salt is to be obtained. The calcium salt may also be prepared in a non-aqueous environment by the reaction of calcium carbide with the free substituted acid of phosphorus.

The preferred acids are organo acids of pentavalent phosphorus, and the preferred salts comprise the oil soluble magnesium, aluminum, calcium, barium, tin and chromium salts of these acids. Examples of salts of organo substituted acids of phosphorus are:

*Partially esterified phosphorous acids* (type formula of salt-forming acid,

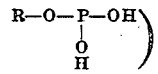

The magnesium, aluminum, calcium, barium, tin and chromium salts of monododecyl, monotetradecyl, monocetyl, mono-octadecyl, mono-(hexylphenyl), mono-(decylphenyl), mono-(tetradecylphenyl), mono-(cetylphenyl), and mono-(octadecylphenyl), esters of phosphorous acid.

*Diesters*—(type formula,

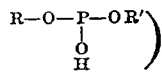
)

The magnesium, aluminum, calcium, barium, tin and chromium salts of dihexyl, didodecyl, ditetradecyl, dicetyl, dioctadecyl, di-(hexylphenyl), di-(decylphenyl), di-(tetradecylphenyl), di-(cetylphenyl), and di-(octadecylphenyl), esters of phosphorous acid.

*Partially esterified phosphonous acids* (type formula of salt-forming acid,

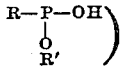
)

The magnesium, aluminum, calcium, barium, tin and chromium salts of hexyl, octyl, decyl, dodecyl, tetradecyl, cetyl, and octadecyl, esters of phenylphosphonous acid; the magnesium, aluminum, calcium, barium, tin and chromium salts of benzyl, ethylphenyl, amylphenyl, decylphenyl, dodecylphenyl, tetradecylphenyl, and cetylphenyl, esters of phenylphosphonous acid.

*Partially esterified acids of pentavalent phosphorus* (type formula of salt-forming acid,

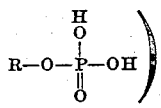
)

The magnesium, aluminum, calcium, barium, tin and chromium salts of monododecyl, monotetradecyl, monocetyl, mono-octadecyl, mono-(hexylphenyl), mono-(decylphenyl), mono-(tetradecylphenyl), mono-(cetylphenyl), and mono-(octadecylphenyl), esters of phosphoric acid.

*Diesters*—(type formula,

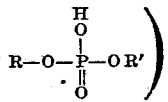
)

The magnesium, alumina, calcium, barium, tin and chromium salts of dihexyl, didodecyl, ditetradecyl, dicetyl, dioctadecyl, di-(hexylphenyl), di-(decylphenyl), di-(tetradecylphenyl), di-(cetylphenyl), and di-(octadecylphenyl), esters of phosphoric acid.

*Partially esterified phosphonic acids* (type formula of salt-forming acid,

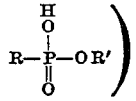
)

The magnesium, aluminum, calcium, barium, tin and chromium salts of hexyl, octyl, decyl, dodecyl, tetradecyl, cetyl, and octadecyl, esters of phenylphosphonic acid; the magnesium, aluminum, calcium, barium, tin and chromium salts of benzyl, ethylphenyl, amylphenyl, decylphenyl, dodecylphenyl, tetradecylphenyl, and cetylphenyl, esters of phenylphosphonic acid.

*Partially esterified thioacids of pentavalent phosphorus* (type formula of salt-forming acid,

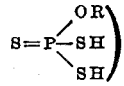
)

The magnesium, aluminum, calcium, barium, tin and chromium salts of monododecyl, monotetradecyl, monocetyl, mono-octadecyl, mono-(hexylphenyl), mono-(decylphenyl), mono-(tetradecylphenyl), mono-(cetylphenyl), and mono-(octadecylphenyl), esters of tetrathiophosphoric acid.

*Diesters*—(type formula,

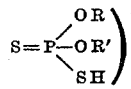
)

The magnesium, aluminum, calcium, barium, tin and chromium salts of dihexyl, didodecyl, ditetradecyl, dicetyl, dioctadecyl, di-(hexylphenyl), di-(decylphenyl), di-(tetradecylphenyl), di-(cetylphenyl), and di-(octadecylphenyl), esters of tetrathiophosphoric acid.

The alkali metal salts are the easiest prepared in general, and the other desired metal salts of substituted acids of phosphorus may be obtained usually from aqueous or aqueous alcoholic solutions of the alkali metal salts by adding an aqueous solution containing the desired precipitating metal ion. For additional data on salts of acids of phosphorus usable in the combinations of this invention, see the patents to Farrington et al. Nos. 2,228,658 and 2,228,659 issued January 14, 1941, and the patents to Rutherford et al. Nos. 2,252,984 and 2,252,985 issued August 19, 1941. It is to be understood that any of the salts of the acids of phosphorus disclosed in said patents may be utilized in, and are contemplated as falling within the scope of, this invention insofar as the salts of organo inorganic acids are concerned.

TYPE 6.—ACIDS OF SULPHUR CONTAINING AN ORGANIC SUBSTITUENT AND METAL SALTS THEREOF

The normal or dialkyl esters of sulfuric acid may be prepared by the reaction of alkyl iodides and silver sulfate or from chlorosulfonic esters or sulfuryl chloride and sodium alcoholate, as well as by other methods known in the art. These diesters may be hydrolyzed to the acid or monoester of sulfuric acid, which in turn may be converted to salts such as involved herein.

The alkyl acid esters of sulfuric acid also may be prepared by reaction of alcohols with concentrated sulfuric acid and boiling the product of reaction, after dilution with water, with an excess of barium carbonate. Likewise, the alkyl acid esters are obtainable by the union of alkylenes with concentrated sulfuric acid.

Alkali metal salts of alkyl thiosulfuric acids may be prepared by acting on alkali thiosulfates with primary saturated alkyl iodides or bromides. The free acids are not stable. Likewise, alkyl thiosulfonic acids are only stable as salts or esters. They are formed by the action of the chlorides of sulfo-acids on potassium sulfide, for example—

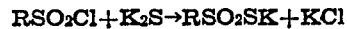

Alkyl sulfinic acids or salts thereof may be formed as follows—

(1) By the oxidation of dry sodium mercapitides in air—

$$RSNa + O_2 \rightarrow RSO_2Na$$

(2) By the action of $SO_2$ on zinc alkyls or magnesium alkyl halides or by the action of $SO_2Cl_2$ on magnesium alkyl halides—

$$R_2Zn + SO_2 \rightarrow (RSO_2)_2Zn$$

$$RMgI + SO_2Cl_2 \rightarrow RSO_2MgI + RCl + MgClI$$

(3) By the action of zinc on the sulfonyl chlorides—

$$2RSO_2Cl + Zn \rightarrow (RSO_2)_2Zn + ZnCl_2$$

Salts of aryl sulfinic acids may be prepared by treating an aryl sulphon chloride with zinc—

$$2RSO_2Cl + 2Zn \rightarrow (RSO_2)_2Zn + ZnCl_2$$

Salts of aryl thiosulfonic acids may be prepared by treating sulphon chlorides with metallic sulfides, for example—

$$RSO_2Cl + K_2S \rightarrow RSO_2SK + KCl$$

It should be borne in mind that salts of all of the foregoing acids of sulfur which might be prepared are not sufficiently stable under certain conditions to render them desirable additives in all cases, particularly where the conditions to be encountered are especially severe or introduce a physical or chemical environment especially destructive to certain types of compounds For this reason, the particular salts of acids of sulfur containing an organic substituent must be selected with the ultimate conditions to which the finished product is to be subjected kept in mind.

MISCELLANEOUS COMPOUNDS

Sodium triphenyl germanolate, $(C_6H_5)_3GeONa$, is the oxidation product of sodium triphenyl germanide, $(C_6H_5)_3GeNa$, the operation being carried out in the dry state or in benzene or in liquid ammonia solutions. The product from the latter solvent contains 1 mol of ammonia of crystallization.

Trimethylstannyl-triphenyl germane, $$(CH_3)_3Sn.Ge(C_6H_5)_3$$

is readily obtainable by treating a liquid ammonia solution of sodium triphenyl germanide with tin trimethyl bromide.

Diphenyl stibinous acid, $(C_6H_5)_2SbOOH$, may be prepared as follows: Add 17 grams Na to a solution of 40 grams $SbCl_3$ and 40 grams $C_6H_5Cl$ in four times its volume of $C_6H_6$ to form diphenyl stibine trichloride. Triphenyl stibine and triphenyl stibine dichloride are also formed. The trichloride can be separated from the triphenyl stibine by extraction with hot dilute HCl. It is crystallized from the latter. Small amounts of the dichloride as impurity do not matter as they are separated in the next step. The trichloride is dissolved in alcohol and $NH_4OH$ is added. This precipitates diphenyl stibinous acid, but not the hydroxide of the dichloride. Salts of this acid may be prepared by known methods.

Bis.(3.5 dichlor-4-methoxyphenyl) stibinous acid, $(CH_3OC_6H_2Cl_2)_2SbOOH$, is prepared from tris-(4-methoxyphenyl) stibine by chlorinating a solution of one part of the stibine and fifteen parts of $CHCl_3$ for six hours at 0° C. 2.4.6.trichloranisol is also formed. Crystallize from $CHCl_3$ and benzene solution. Hydrolyze by dissolving in ether, adding absolute alcohol, and then aqueous alcohol solution, and finally precipitating with water. The tris-(4-methoxyphenyl) stibine is obtained by adding sodium to a mixture of $SbCl_3$ and 4-bromanisol in benzene.

Benzene stibonic acid, $C_6H_5SbO(OH)_2$: First prepare phenyl antimony dichloride by heating triphenyl stibine with $SbCl_3$ and xylene at 240–245° C. under pressure. Crystallize the reaction product from benzene. Saturate an ethereal solution of the phenyl antimony dichloride in the cold with $Cl_2$, evaporate the ether, and dissolve the resulting tetrachloride in dilute NaOH. To obtain the acid, precipitate with dilute HCl.

The barium salt of the above acid may be prepared by adding barium chloride to an ammoniacal solution of the acid.

Aromatic stibonic acids in general may be prepared by a diazo reaction in which a diazo compound is treated with antimony oxide in the presence of a polyhydric alcohol such as glycerol or mannitol; e. g. a solution of antimony oxide in HCl, to which glycerine has been added, is poured into an ice-cooled solution of diazotized aniline and NaOH is then added. The resulting phenyl stibonic acid is precipitated with HCl and may be purified. Similarly, p-tolyl stibonic acid, p-chlorophenyl stibonic acid, and m-chloro-p-acetyl aminophenyl stibonic acid may be formed.

Alkyl stannonic acids may be prepared by reacting an alkyl bromide with an alkaline aqueous solution of potassium hydrogen stannite in the presence of alcohol. Also, by the interaction of $SnCl_2$ with the appropriate hydrocarbon iodide in alcoholic KOH at low temperatures the following stannonic acids have been prepared: phenyl, benzyl, α-naphthyl, allyl, dichloromethyl, 1-bromoethyl, and acetonyl stannonic acids. p-chlorophenyl stannonic acid, $$ClC_6H_4SnOOH$$

may be prepared by: heating $(p-ClC_6H_4)_2Hg$ and $SnCl_2$ in absolute ethyl alcohol to give $$(p-ClC_6H_4)_2SnCl_2$$

This dichloride is converted to the trichloride, $p-ClC_6H_4SnCl_3$, by heating with SnCl in a bomb tube at 150°. Stannonic acid is prepared by dissolving the resulting trichloride in petroleum ether and adding an excess of 5% aqueous KOH.

Salts of the foregoing acids may be prepared by neutralization, double decomposition and various known methods.

Amine salts of the acids disclosed in this specification fall within the broader aspects of the invention as heretofore indicated. Examples of suitable amines are the alkyl amines, such as triethyl amine; the alkylol amines like triethanol amine; and the aromatic amines, such as aniline. Nitrogen bases obtained from petroleum, and especially reduced nitrogen bases such as homologues of piperidine, are also included as an amine with which the salts of this invention may be made.

Reference has previously been made to derivatives of halogenated organo acids of the type herein disclosed. These compounds are useful particularly where, in addition to the properties previously disclosed herein, enhanced film strength, oiliness or reduction of wear is desired. Examples of halogenated acids, the salts of which may be utilized in accordance with this invention, are 2-chlorophenyl arsonic acid, 4-chlorophenyl arsonic acid, and the half esters of these acids; p-chlorophenyl boronic acid, p-bromophenyl boronic acid, and chlorinated thio-acids, such as chlorinated thio-arsinic acids, chlorinated thio-arsonic acids, chlorinated thio-arsenous acids, chlorinated thio-arsonous acids, and partial esters of these acids. Polyvalent metals salts, such as magnesium, aluminum, calcium, barium, tin and chromium salts of the acids in the foregoing list, are preferred.

The proportion of the metal salts of organo inorganic acids herein disclosed which may be added to hydrocarbon oils according to the principles of the present invention may vary widely, depending upon the uses involved and the properties desired. As little as 0.05% by weight of various of the compounds gives measurable improvements. From approximately 0.1% to 2% of the compounds may be added to lubricants where enhanced stability under oxidizing conditions is desired. More than 2% of the compounds may be utilized for various purposes, e. g. for preparing lubricating greases and concentrates capable of dilution with mineral lubricating oils and the like. Concentrates containing high percentages of the addition agents comprise a convenient method of handling the ingredients and may be marketed as such as addition agents for lubricants in general as well as for other purposes.

The compounded hydrocarbon oils herein disclosed may have one or more advantages depending upon the particular compounding agents selected, the proportions utilized and the environment or use which the compounded oil is to encounter. It should be observed, for example, that even though a compounded oil may be somewhat corrosive to copper-lead or cadmium-silver bearing metals, Babbitt bearings may be little if at all affected by such corrosive action. Hence, compounded oils which may not be particularly desirable for lubrication of copper-lead or cadmium-silver bearings at high temperatures where corrosion becomes a factor of importance may be highly useful and extremely advantageous in conjunction with operations where bearings of babbitt or other corrosive-resistant bearing metals are utilized. Likewise, compounded oils in which the addition agent is not sufficiently powerful to stabilize the oil against deterioration by oxidation under the most severe conditions may be highly useful in those applications where the temperatures or oxidizing conditions encountered are not so severe, e. g. in a transformer oil. The present invention in its broader aspects is therefore not limited to the particular ingredients having all or the greatest number of advantages obtainable, but embraces various of the less advantageous addition agents which will find utility in particular applications where all the possible improvements in the properties may not be required or where the standard of performance may not be so high.

In the preparation of either the finished oils of the invention or the bases or concentrates referred to, complete or clear and homogeneous solution is not always necessary. Blending agents or homogenizers may be employed, if desirable, to prevent sedimentation of the less oil-soluble agents but it has been found that the possible detrimental effect of the presence of filterable insoluble materials of this character, if present, is determined largely by the particular conditions attending the contemplated use and that with those addition agents of limited oil-solubility the presence of additional oil-insoluble agents is not in all cases deleterious to the function of the compositions in their intended manner.

Even in those cases where suitable oil solubility is not obtainable by blending agents, it will be found that various of the addition agents of only limited oil-solubility may be utilized. This is particularly true in greases where dispersion of the additive in finely powdered form may be adopted and beneficial functions obtained. In most liquid lubricating oils, oil-insolubility of the additive is a disadvantage although dispersions of oil-insoluble additives in liquid mineral oils may be utilized as transformer oils and the like.

The foregoing disclosure has been for the most part an elaboration of the many addition agents illustrative of the metal oxides, sulfides and selenides otherwise termed metal salts of organo inorganic acids which comprise only one component of the combination of ingredients comprising the present invention. The second component of the combination is a stabilizer of the type represented by dialkyl thioethers and dialkyl selenides. Examples of thioethers operative for the purpose of the invention are high molecular weight dialkyl thioethers containing at least one long carbon chain. By "long carbon chain" is meant a radical containing at least eight to ten carbon atoms. By "high molecular weight thioethers" it is intended to designate thioethers containing in the order of a total of twelve or more carbon atoms. Examples of seleno ethers are the corresponding high molecular weight dialkyl monoseleno ethers.

Specific high molecular weight dialkyl thioethers illustrative of the invention are the following monothioethers: dioctyl thioether; octyldecyl thioether; octyldodecyl thioether; octyltetradecyl thioether; octylcetyl thioether; didecyl thioether; decyldodecyl thioether; decyltetradecyl thioether; decylcetyl thioether; didodecyl thioether; dodecyltetradecyl thioether; dodecylcetyl thioether; ditetradecyl thioether; tetradecylcetyl thioether; dicetyl thioether; and dioctadecyl thioether. One quite effective type of dialkyl monothioether is characterized by one long chain and one short chain; for example: dodecyl methyl monothioether, dodecyl ethyl monothioether, dodecyl propyl monothioether; tetradecyl methyl monothioether, tetradecyl ethyl monothioether, tetradecyl propyl monothioether; cetyl methyl monothioether, cetyl ethyl monothioether, and cetyl propyl monothioether.

Likewise, examples of dialkyl seleno ethers suitable for the purposes of this invention are: dioctyl seleno ether, octyldecyl seleno ether, octyldodecyl seleno ether, octyltetradecyl seleno ether, octylcetyl seleno ether, didecyl seleno ether, decyldodecyl seleno ether, decyltetradecyl seleno ether, decylcetyl seleno ether, didodecyl seleno ether, dodecyltetradecyl seleno ether, dodecylcetyl seleno ether, ditetradecyl seleno ether, tetradecylcetyl seleno ether, dicetyl seleno ether, dioctadecyl selenoether; dodecyl methyl monoseleno ether, dodecyl ethyl monoseleno ether, dodecyl propyl monoseleno ether; tetradecyl methyl monoselenoether, tetradecyl ethyl monoseleno ether, tetradecyl propyl monoseleno ether; cetyl methyl monoseleno ether, cetyl ethyl monoseleno ether, and cetyl propyl monoseleno ether.

The foregoing compounds are represented by the type formula—

$$R-X-R_1$$

where R and $R_1$ may be the same or different alkyl radicals, and X is sulfur or selenium. R and $R_1$ may be either a straight hydrocarbon chain or a branched chain such as obtained from isobutylene polymers or interpolymers of butylene with isobutylene and other analogous olefin polymer derivatives. Telluro ethers also are embraced within the broader aspects of the invention, and X in the foregoing formula may therefore be tellurium.

Monothio or dithio dialkyl diethers of the general formulae:

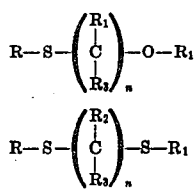

for example, monothioethane dialkyl diethers or dithioethane dialkyl diethers, are also effective in the combination of this invention. These latter compounds may be represented by the formulae:

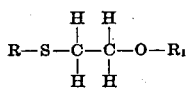

and

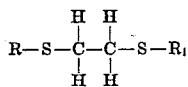

where R and $R_1$ may be any of the alkyl radicals previously listed for these radicals, $R_2$ and $R_3$ may be either hydrogen or any one of such alkyl radicals, and $n$ may be any whole number. Sulfoxides such as—

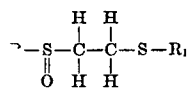

are not precluded.

It is to be understood that the invention in its broader aspects does not preclude the use of substituted alkyl radicals in the thioether component of the composition. However, when such a substituent is present it should not be so close to the sulfur atom of the thioether group as to substantially destroy the essential thioether characteristics of the sulfur atom. Thus, functional groups in the alkyl radicals of thioether which are positioned on the alkyl chain relatively remote from the thioether sulfur atom may be utilized. For example, thioethers derived from oleic acid esters are effective compounds in the combination of this invention. This type of compound may be represented by the formula:

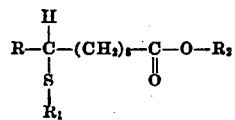

where R, $R_1$ and $R_2$ are alkyl radicals, $R_1$ preferably being a relatively short chain such as an ethyl group. The carbonyl group of the above type compound is sufficiently far removed from the thioether group as not to mask or adversely affect the action of the thioether structure. Likewise, the thioethers remain essentially dialkyl thioether, even though aryl or other nonaliphatic radicals be attached to the alkyl chain at a point remote from the thioether group, and such compounds may be utilized in the combination herein disclosed.

The thioethers utilized herein may be prepared by methods known in the art. For example, a monohalogenated hydrocarbon may be reacted with a mercaptide to yield a thioether according to the reaction—

$$RCl + R_1SNa \rightarrow RSR_1 + NaCl$$

The conditions for carrying out this reaction are well known and alternative processes for forming thioethers may be found by reference to the literature.

Among the improvements which the compounding agents of this invention may impart to hydrocarbon oils is increased resistance to oxidation or absorption of oxygen at superatmospheric temperatures. Decreased deterioration of the type which causes corrosion of modern bearing metals is additionally among the improvements. The dialkyl thioethers or seleno ethers in general serve as a corrosion inhibitor and/or a sensitizer to enhance the responsiveness of the hydrocarbon oil to the stabilizing action of the metal salt stabilizer. When the base oil being stabilized is of high viscosity index or "over-refined," the thioether or seleno ether ingredient usually functions primarily as a sensitizer. When the base oil is of low viscosity index or low refinement the ingredient may serve primarily as a corrosion inhibitor. In moderately refined or moderate viscosity index base oils the ether type of ingredient may serve both as a sensitizer and a corrosion inhibitor. The following data illustrate the foregoing features of the invention:

In tests whose results are reported below the oils referred to were subjected to oxidator tests particularly described in the Journal of Industrial & Engineering Chemistry, vol. 28, page 26, 1936. These tests were carried out at 300° F. and 340° F., as indicated, which conditions it may be noted are extremely severe. The results of the tests are reported in cubic centimeters of oxygen absorbed per 100 grams of the respective oils.

The inhibition period shown in various instances is that period from the start of the test during which oxidation is inhibited or proceeds at a reduced rate. At the end of the inhibition period the rate of oxidation very materially increases by what is known as an autocatalytic phenomenon. Thus the inhibition period is a measure of the effectiveness of the stabilizers insofar as prevention or reduction of oxidation is concerned.

TABLE I
Oxidator tests

| Oil | Cc. oxygen/100 cc. oil after— | | | | Inhibition period |
|---|---|---|---|---|---|
| | 0.5 hr. | 1 hr. | 2 hr. | 4 hr. | |
| | | | | | Hours |
| White oil heavy | >2,000 | | | | 0.1 |
| White oil heavy+1% potassium cetyl xanthate | 60 | >1,000 | | | 0.9 |
| White oil heavy+1% dicetyl sulfide | >2,000 | | | | 0.1 |
| White oil heavy+1% potassium cetyl xanthate+1% dicetyl sulfide | 70 | 100 | >1,000 | | 1.1 |
| White oil heavy+1% zinc N-pentamethylene dithiocarbamate | 45 | 65 | 75 | | |
| White oil heavy+1% zinc N-pentamethylene dithiocarbamate +1% dicetyl sulfide | 5 | 7 | 10 | 14 | |
| White oil heavy+1% octylbenzyl dithiocarbonate | >1,000 | | | | 0.1 |
| White oil heavy+1% octylbenzyl dithiocarbonate+1% dicetyl sulfide | >1,000 | | | | 0.45 |
| White oil heavy+1% dibenzyl dithiocarbonate | >1,000 | | | | 0.15 |
| White oil heavy+1% dibenzyl dithiocarbonate+1% dicetyl sulfide | 10 | >1,000 | | | 0.7 |

From the foregoing data it will be noted that in the white oil heavy, dicetyl sulfide alone has little or no effect as an oxidation inhibitor under the particular severe conditions encountered. Yet a substantially greater inhibition of oxidation or a substantially longer inhibition period were effected by the combination of the carbonates, thiocarbonates, or carbamates with dicetyl sulfide in the oil than with either component alone. Thus the metal salt component appears to serve as an activator for the thioether. The white oil heavy used as a base oil in these tests is a very highly refined mineral oil from which a major proportion or substantially all of non-hydrocarbon components have been removed by refinement.

The following data illustrate the novel cooperative action between thioethers and salts of acids of phosphorus containing an organic substituent:

TABLE II
Oxidator data

| Oil | Cc. oxygen absorbed at 300° F. | | |
|---|---|---|---|
| | 2 hrs. | 4 hrs. | 6 hrs. |
| White oil | Greater than 1,000 cc. first ½ hr. | | |
| White oil+1% cetylethyl thioether | Greater than 1,000 cc. first ½ hr. | | |
| White oil+1% calcium cetyl phosphate | Greater than 1,000 cc. first ½ hr. | | |
| White oil+1% calcium cetyl phosphate +0.25% cetylethyl thioether | 50 | 69 | 88 |
| White oil+1% dioctyl thioether | 360 | | |
| White oil+1% dioctyl thioether+1% calcium cetyl phosphate | 40 | | |
| White oil+2% cetylmethyl thioether | 650 cc. first hour. | | |
| White oil+2% cetylmethyl thioether+1% calcium cetyl phosphate | 10 | 15 | |
| | Tests below at 340° F. | | |
| White oil+2% dioctadecyl thioether | >2,400 | | |
| White oil+2% dioctadecylthioether+1% calcium cetyl phosphate | 107 | 168 | 257 |
| White oil+1% ethane dioctyl dithioether | 360 | | |
| White oil+1% ethane dioctyl dithioether +1% calcium cetyl phosphate | 45 | | |

| Oil | Cc. oxygen absorbed at 340° F. | | |
|---|---|---|---|
| | 2 hrs. | 4 hrs. | 6 hrs. |
| Highly refined naphthenic base oil | Greater than 1,000 cc. first ½ hr. | | |
| Highly refined naphthenic base oil+1% dilauryl thioether | 100 | 296 | 588 |
| Highly refined naphthenic base oil+1% dilauryl thioether+1% calcium cetyl phosphate | 12 | 24 | 53 |
| Highly refined naphthenic base oil+2% dicetyl thioether | 50 | >1,000 | |
| Highly refined naphthenic base oil+2% dicetyl thioether+1% calcium cetyl phosphate | 70 | 135 | 200 |

Mention has been made of acid esters of inorganic acids, such as partially esterified acids of phosphorus, as useful in obtaining a novel cooperative action or activating effect with thioethers. The novel cooperative action of such acid esters is illustrated by the following data:

TABLE III
Oxidator data

| Oil | Cc. oxygen absorbed at 340° F. | |
|---|---|---|
| | 1 hr. | 2 hrs. |
| White oil | Greater than 1,000 cc. first ½ hr. | |
| White oil+1% cetylethyl thioether | Greater than 1,000 cc. first ½ hr. | |
| White oil+1% dicetyl phosphoric acid | Greater than 1,000 cc. first ½ hr. | |
| White oil+1% dicetyl phosphoric acid+1% cetylethyl thioether | 10 | 15 |
| White oil+1% monocetyl phosphoric acid | Greater than 1,000 cc. first ½ hr. | |
| White oil+1% monocetyl phosphoric acid +1% cetylethyl thioether | 125 | 290 |

An additional indication of the novel cooperative action of the ethers of this invention and salts of organo-inorganic acids comprises the reduction in corrosion of copper-lead and cadmium-silver bearing metal alloys at elevated temperatures. Table IV exemplifies this result:

TABLE IV

| Oil | 300° F. corrosion test | |
|---|---|---|
| | Loss Cu-Pb mg. weight 72 hrs. | Loss Cd-Ag mg. weight 72 hrs. |
| White oil | 58 | 83 |
| White oil+1% calcium cetyl phosphate | 128 | 147 |
| White oil+1% cetylethyl sulfide | 41 | 0.4 |
| White oil+1% cetylethyl sulfide+1% calcium cetyl phosphate | 25 | 2.9 |
| White oil+1% calcium sulfonates (from mineral oil) | [1] 53.2 | 82.8 |
| White oil+1% calcium sulfonates (from mineral oil)+1% dicetyl sulfide | [2] 26.9 | 1.0 |
| White oil+1% potassium cetyl xanthate | 37.2 | 32.3 |
| White oil+1% potassium cetyl xanthate+1% dicetyl sulfide | [2] 19.0 | 0.4 |

[1] Gum on strip.
[2] Strip darkened.

The term "over-refined oil" is used to designate those oils from which naturally-occurring inhibitors normally present in the oil have been removed at least to an extent which materially reduces the stability of the oil against deterioration at higher temperatures or which substantially increases corrosiveness of the oil on modern bearing metals. Over-refined oils are not necessarily high viscosity index oils since oils of intermediate viscosity index are sometimes produced from quite low viscosity index stocks by a severe refinement which causes a substantial reduction in the natural inhibitor content of the oil and thereby produces an oil having a correspondingly reduced stability. From the above it should be apparent that over-refined oils are not limited to those produced by solvent extraction. Other refining processes, e. g. sulfuric acid treatment to produce white oils, remove naturally-occurring inhibitors originally in the oil when the treatment is sufficiently severe and thereby produce over-refinement with the attendant difficulties herein discussed.

In general, over-refined oils may be characterized as having natural inhibitors removed to the point where the corrosiveness of the oil is greater than about 40 mgs. on a 1" x 2" coarse grained copper-lead bearing in a 72-hour corrosion test (described below) run under the following conditions:

Air rate_____ 30 liters per hour
Temperature_____ 300° F.
Catalyst_____10 gms. of steel wool and a 6" x 1" copper strip The strip corrosion data above given were obtained in corrosion tests carried out in the following manner: Glass tubes two inches in diameter and twenty inches long were immersed in an oil bath, the temperature of which was automatically controlled to within ±1° F. of the test temperature indicated. Approximately 300 cc. of oil under test was placed in each tube and air was bubbled through it. Strips of the different types of the bearing metals were placed in the oil. The weight loss of each strip was recorded. Before weighing, each strip was washed in petroleum ether and carefully wiped with a soft cotton cloth. The duration of the tests was 72 hours.

Highly solvent refined oils and other over-refined oils are not the only type which become definitely corrosive to the newer bearing metals under normal but severe conditions of use in internal combustion engines. It has been found that a corresponding adverse reaction, namely, corrosion of alloy bearing metals such as cadmium silver alloys, also occurs in paraffinic base oils which have not been solvent refined or over-refined. The higher the viscosity index of the lubricating oil the more pronounced is the tendency to corrosion of the kind referred to. Generally speaking, the problem is encountered in oils having viscosity indexes of 75 and higher, and becomes of major magnitude in oils having a viscosity index of 80 to 85 or higher. Oils of these viscosity indexes are herein termed "high viscosity index."

The proportion of the thioethers, seleno ethers or telluro ethers present in the compounded oil may vary widely depending on the uses involved and the properties desired. As little as 0.05% of the ether gives measurable improvement, although from approximately 0.1% to 2% is preferred where the compounded oil is to be used as a crankcase lubricant for internal combustion engines. 5% or more by weight of the ethers may be dissolved in mineral oil or other suitable organic solvents for the purpose of preparing a concentrate capable of dilution with lubricating oils and the like to yield a finished lubricant. Concentrates containing high percentages, e. g. 50% of the thioether and the salt of organo inorganic acid, comprise a convenient method of handling these ingredients and may be used as addition agents for lubricants in general as well as for other purposes.

The preferred hydrocarbon oil is a mineral lubricating oil fraction such as a moderately acid refined naphthenic base lubricating oil. Other base oil stocks for the compounded oils involved herein may be utilized such as the over-refined oils, solvent refined oils, paraffinic oils with or without solvent refining, or highly refined naphthenic oils, as well as synthetic hydrocarbon oils. It is to be understood that the broader aspects of the invention are not limited to any particular base stock since advantageous properties may be obtained at least to some degree with various oils, the selection of which will be determined by conditions and services which the product is to encounter and by the particular combination of additives utilized.

The combination of compounding agents hereinbefore disclosed may be advantageously utilized in conjunction with metal salts of organic acids in hydrocarbon oils. The metal salts of organic acids and the herein previously-described additives cooperate to give enhanced stabilizing action and each type of additive, in some instances, inhibits undesirable effects of the other type of addition agent in the combination.

Examples of metal salts of organic acids which may be incorporated in lubricating oils, together with the thioethers or seleno ethers and the oxides, sulfides and selenides heretofore described, are metal salts of higher fatty or aliphatic acids, metal salts of naphthenic acids, metal salts of oil-soluble substituted phenols, and metal salts of carboxylic acids containing an aryl substituent.

Among the metal salts of higher fatty acids may be mentioned: aluminum laurate, aluminum oleate, aluminum stearate, aluminum ricinoleate; zinc laurate, zinc oleate, zinc stearate, zinc ricinoleate; tin laurate, tin oleate, tin stearate, tin ricinoleate; magnesium laurate, magnesium oleate, magnesium stearate, magnesium ricinoleate; calcium laurate, calcium oleate, calcium stearate, calcium ricinoleate; chromium laurate, chromium oleate, chromium stearate, chromium ricinoleate; barium laurate, barium oleate, barium stearate, and barium ricinoleate.

Examples of metal napthenates are: aluminum naphthenate, zinc naphthenate, magnesium naphthenate, cobalt naphthenate, cadmium naphthenate, tin naphthenate and manganese naphthenate. The naphthenic acid component of these salts may conveniently be obtained from petroleum.

Metal phenates which may be mentioned comprise metal salts of a substituted phenol of the type formula:

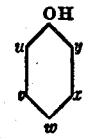

in which $u$, $v$, $w$, $x$ and $y$ are selected from the group consisting of hydrogen, alkyl aryl, alkaryl, aralkyl and cyclic nonbenzenoid hydrocarbon radicals. Specific illustrations of such phenates are the aluminum, zinc, tin, magnesium, calcium, chromium and barium as well as other polyvalent metal salts of cetyl phenol. The phenolic radical of the salts preferably contains more than about ten carbon atoms and also should preferably have an alkyl substituent substituted in the benzene ring to which the hydroxyl group of the phenol is directly attached.

Examples of carboxylic acids containing an aryl substituent are: phenyl stearic acid, naphthyl stearic acid, phenyl lauric acid, alpha benzal stearic acid, alpha benzal lauric acid, and analogous homologues of these acids formed by condensation of an aromatic aldehyde with a fatty acid according to the reaction—

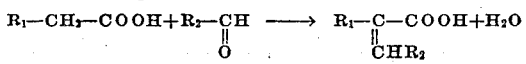

where $R_1$ is an alkyl and $R_2$ an aryl radical. Aluminum, zinc, tin, magnesium, calcium, chromium and barium, as well as other polyvalent metal salts of each of the above acids, may be utilized.

The invention also includes salts of polycarboxylic acids. Examples of such salts are the aluminum, zinc, tin, magnesium, calcium, chromium and barium as well as other polyvalent metal salts of partially esterified acids of the oxalic acid series, including oxalic acid itself, malonic acid, isosuccinic or methyl malonic acid and its alkyl homologues, as well as the corresponding salts of partially esterified alkyl tartronic acid, partially esterified malic acid and its homologues, partially esterified oxyglutaric acid, partially esterified hydroxy adipic acid, partially esterified tartaric acid, partially esterified citric acid and the like.

The present invention is primarily concerned with improvement of liquid lubricating compositions, and the proportion of the foregoing metal salts of organic acids should therefore preferably be insufficient to form greases or cause substantial gelling of the oil. In general, from about 0.1% to 2% by weight based on the finished oil may be utilized, and from approximately 0.5% to 1.5% by weight of the metal salts of organic acids is preferred.

The addition agents of this invention may be utilized in hydrocarbon oils containing auxiliary compounding agents such as pour point depressants, oiliness agents, extreme pressure addition agents, blooming agents, compounds for enhancing the viscosity index of the hydrocarbon oil and auxiliary stabilizing agents such as metal alcoholates. Further, thickening agents and/or metal soaps in grease-forming proportions are not precluded from the broader aspects of the invention.

High molecular weight dialkyl seleno ethers and telluro ethers disclosed herein and claimed in combination with salts of organo-inorganic acid in hydrocarbon oil are claimed broadly as addition agents for hydrocarbon oil and as new compositions of matter in our copending applications Serial Nos. 476,759 and 476,760, respectively, filed February 22, 1943.

While the character of the invention has been described in detail and numerous examples of the compounds given, this has been done by way of illustration only and with the intention that no limitation should be imposed upon the invention thereby. It will be apparent to those skilled in the art that numerous modifications and variations of the illustrative examples may be effected in the practice of the invention which is of the scope of the claims appended hereto.

We claim:

1. A composition comprising a hydrocarbon oil, an ether of an element of group VI—B of Mendelyeev's Periodic Table and selected from the class consisting of sulfur, selenium and tellurium, said ether being present in an amount sufficient to stabilize said oil against deterioration under oxidizing conditions, and a salt of an organo-inorganic acid in an amount sufficient to enhance the stabilizing action of said ether.

2. A composition comprising a hydrocarbon oil, an ether of an element of group VI—B of Mendelyeev's Periodic Table and selected from the class consisting of sulfur, selenium and tellurium, said ether being present in an amount sufficient to stabilize said oil against deterioration under oxidizing conditions, and a salt of an organic substituted inorganic acid of a weak acid-forming element.

3. A composition comprising a hydrocarbon oil, a thioether in an amount sufficient to stabilize said oil against deterioration under oxidizing conditions, and a salt of an organo-inorganic acid in an amount sufficient to enhance the stabilizing action of said thioether.

4. A composition comprising a hydrocarbon oil containing a small amount of an ether of an element of group VI—B of Mendelyeev's Periodic Table and selected from the class consisting of sulfur, selenium and tellurium, and a small amount of a compound of the type—

$$(A)(X)(Z)(X_1)(R_n)$$

in which A represents a basic salt-forming substituent, X and $X_1$ are selected from the group consisting of oxygen, sulfur and selenium, Z is an acid-forming element selected from groups III—A, IV, V—B and VI—B of Mendelyeev's Periodic Table, R is an organic radical, and $n$ is a whole number no less than one.

5. A composition as defined in claim 4 wherein said ether is a dialkyl thioether.

6. A composition as defined in claim 4 wherein said ether is a dialkyl dithiodiether.

7. A composition comprising a hydrocarbon oil, an ether of an element of group VI—B of Mendelyeev's Periodic Table of the Elements and selected from the class consisting of sulfur, selenium and tellurium, said ether being present in an amount sufficient to stabilize said oil against deterioration under oxidizing conditions, and a salt of an acid of boron containing an organic substituent.

8. A composition comprising a hydrocarbon oil, an ether of an element of group VI—B of Mendelyeev's Periodic Table of the Elements and selected from the class consisting of sulfur, selenium and tellurium, said ether being present in an amount sufficient to stabilize said oil against deterioration under oxidizing conditions, and a salt of an acid of sulfur containing an organic substituent.

9. A composition comprising a hydrocarbon oil, an ether of an element of group VI—B of Mendelyeev's Periodic Table of the Elements and selected from the class consisting of sulfur, selenium and tellurium, said ether being present in an amount sufficient to stabilize said oil against deterioration under oxidizing conditions, and a salt of a partially esterified carbonic acid.

10. A composition comprising a hydrocarbon oil, an ether of an element of group VI—B of Mendelyeev's Periodic Table and selected from the class consisting of sulfur, selenium and tellurium, said ether being present in an amount sufficient to stabilize said oil against deterioration under oxidizing conditions, and a polyvalent metal salt of an organo-inorganic acid in an amount sufficient to enhance the stabilizing action of said ether.

11. A composition comprising a hydrocarbon oil containing a small amount of an ether of an element of group VI—B of Mendelyeev's Periodic Table and selected from the class consisting of sulfur, selenium and tellurium, and a small amount of a compound of the type—

$$(A)(X)(Z)(X_1)(R_n)$$

in which A represents a polyvalent metal salt-forming substituent, x and $X_1$ are selected from the group consisting of oxygen, sulfur and selenium, Z is an acid-forming element selected from groups III—A, IV, V—B and VI—B of Mandelyeev's Periodic Table, R is an organic radical, and $n$ is a whole number no less than one.

12. A composition comprising a hydrocarbon oil, an ether of an element of group VI—B of Mendelyeev's Periodic Table of the Elements and selected from the class consisting of sulfur, selenium and tellurium, said ether being present in an amount sufficient to stabilize said oil against deterioration under oxidizing conditions, and a polyvalent metal salt of an acid of boron containing an organic substituent.

13. A composition comprising a hydrocarbon oil, an ether of an element of group VI—B of Mendelyeev's Periodic Table of the Elements and selected from the class consisting of sulfur, selenium and tellurium, said ether being present in an amount sufficient to stabilize said oil against deterioration under oxidizing conditions, and a polyvalent metal salt of a partially esterified carbonic acid.

14. An addition agent capable of inhibiting deterioration of hydrocarbon oils under oxidizing conditions, comprising a concentrated solution in hydrocarbon oil of an ether of an element of group VI—B of Mendelyeev's Periodic Table of the Elements and selected from the class consisting of sulfur, selenium and tellurium, and a polyvalent metal salt of an organo-inorganic acid, said solution being capable of dilution with mineral lubricating oil to form a homogeneous mixture containing from approximately 0.05% to 2% by weight based on the oil of said ether, and from approximately 0.05% to 2% by weight of said salt.

GEORGE H. DENISON, JR.
PAUL C. CONDIT.